(12) United States Patent
Chen

(10) Patent No.: US 9,770,939 B2
(45) Date of Patent: Sep. 26, 2017

(54) MANUFACTURING METHOD AND STRUCTURE OF CARBON FIBER RIMS

(71) Applicant: ALEX GLOBAL TECHNOLOGY, INC., Tainan (TW)

(72) Inventor: Wei-Chin Chen, Tainan (TW)

(73) Assignee: Alex Global Technology, Inc., Tainan (TW)

( * ) Notice: Subject to any disclaimer, the term of this patent is extended or adjusted under 35 U.S.C. 154(b) by 68 days.

(21) Appl. No.: 14/838,548

(22) Filed: Aug. 28, 2015

(65) Prior Publication Data

US 2017/0057279 A1    Mar. 2, 2017

(51) Int. Cl.
| | | |
|---|---|---|
| B60B 1/00 | (2006.01) | |
| B60B 5/02 | (2006.01) | |
| B60B 21/06 | (2006.01) | |

(52) U.S. Cl.
CPC ............... B60B 1/003 (2013.01); B60B 5/02 (2013.01); *B60B 21/062* (2013.01); *B60B 2310/204* (2013.01); *B60B 2310/214* (2013.01); *B60B 2310/232* (2013.01); *B60B 2310/242* (2013.01); *B60B 2310/321* (2013.01); *B60B 2310/618* (2013.01); *B60B 2310/80* (2013.01); *B60B 2360/10* (2013.01); *B60B 2360/3416* (2013.01); *B60B 2900/111* (2013.01); *B60B 2900/311* (2013.01)

(58) Field of Classification Search
CPC ....... B60B 1/003; B60B 5/02; B60B 2310/80; B60B 2310/321; B60B 2310/618; B60B 2310/204; B60B 2310/52; B60B 2900/311; B60B 2310/60; B60B 2310/232; B60B 2360/10; B60B 2310/242; B60B 21/062; B60B 2360/3416
See application file for complete search history.

(56) References Cited

U.S. PATENT DOCUMENTS

| | | | | |
|---|---|---|---|---|
| 4,213,234 A | * | 7/1980 | Ware | B21D 53/30 156/189 |
| 5,499,864 A | * | 3/1996 | Klein | B60B 21/062 301/58 |
| 7,578,563 B2 | * | 8/2009 | Muraoka | B60B 1/041 301/58 |
| 9,315,071 B2 | * | 4/2016 | Webber | B60B 1/041 |

FOREIGN PATENT DOCUMENTS

| | | |
|---|---|---|
| TW | I308527 B | 5/1995 |
| TW | 200950990 A | 6/1997 |

* cited by examiner

*Primary Examiner* — Richard Chang
(74) *Attorney, Agent, or Firm* — Rosenberg, Klein & Lee

(57) ABSTRACT

A manufacturing method and structure of a carbon fiber rim is revealed. A metal strip is formed by heating a metal substrate to a moldable temperature and then extruded molding. The metal strip comprises two side walls, a connecting wall and an inner rim wall to form a space surrounded by the side walls, the connecting wall, and the inner rim wall. Next, two terminals of the strip are connected to form a circle as a rim frame's embryo. The two side walls, or the two side walls and the inner rim wall of the rim frame's embryo are milled to form plural through holes and become a rim frame. Afterwards, the surface of the rim frame is roughened and covered with a trimmed carbon fiber cloth having a predetermined shape. After heatsetting and surface treating, a carbon fiber rim having a light weight and a strong structure is obtained.

10 Claims, 11 Drawing Sheets

MANUFACTURING METHOD AND STRUCTURE OF CARBON FIBER RIMS

BACKGROUND OF THE INVENTION

Field of Invention

The disclosure relates to a manufacturing method and structure of a carbon fiber rim, especially relates to a rim frame's embryo having many through holes and covered by a carbon fiber cloth, whereby a rim having a light weight and a strong structure is obtained.

Description of Related Art

In addition to as a basic means of transportation, bicycles also has composite functions of recreation and sports. After the elevation of research and development ability and the progress of technology, the appearance, ride comfort, body strength, weight, and speed of bicycle all become development focus. Especially for professional athletics racing bike, ride comfort, body strength, weight, and speed are absolutely the goals of the riders.

In order to develop the bicycle toward the direction of lightweight construction, wheels made of carbon fibers have replaced the traditional metal wheels to effectively reduce the total weight of bicycles.

Traditional molding technology of carbon fiber wheels is setting up an annular pocket and filling air into the annular pocket to inflate the annular pocket first, and then multi layers of carbon fiber cloth sequentially cover the annular pocket, wherein the number of the layers of the carbon fiber cloth is determined by the structural strength. Usually, the surface set up by spokes need higher structure strength, and thus 7 layers of carbon fiber cloth need to be covered thereon. The needed structure strength of the other parts of the wheels is lower, and thus 5 layers of carbon fiber cloth need to be covered thereon. However, since manufacturing the traditional carbon fiber wheels needs sequentially covering multi layers of carbon fiber cloth, the manufacturing construction is quite time-consuming and labor-consuming. In addition, it also has to be noticed that whether air is remained between the layers of the carbon fiber cloth. If air is remained, the layers of the carbon fiber cloth cannot be completely and smoothly laminated, and defective with local protruding is thus produced. Therefore, the traditional manufacturing method cannot effectively decrease the defect rate of the carbon fiber wheels. Moreover, the price of the carbon fiber cloth is expensive, and the cost of laminating multi layers of carbon fiber cloth is thus increased. The reasons above all make the price of the carbon fiber cloth wheels not close to the people.

Patent TW 1308527 B discloses "[a] manufacturing method of bicycle rim." The method laminates multi layers of carbon fiber prepregs to form a primary embryo of a rim. The primary embryo of the rim is placed in a mold to be inflated according to a 3-stage procedure. The outer surfaces of the primary embryo of the rim are forced to be tightly fitted into the inner surface of the mold. At the same time, the primary embryo of the rim is heated to form a secondary embryo of the rim. Finally, the secondary embryo of the rim is set by heating, and the surface of the secondary embryo of the rim is processed to obtain a carbon fiber rim of a bicycle. This method still has the disadvantages of the traditional manufacturing method of carbon fiber wheels. That is, 5-7 layers of carbon fiber prepregs are needed, and thus the manufacturing is time-consuming, high cost, and the defect rate cannot be decreased, as well as it has to be noticed that whether bubbles are generated between adjacent layers when laminating.

Moreover, although the rim made of carbon fiber cloth has the excellent effect of light weight, the carbon fiber wheel cannot meet the requirement of the structure strength and thus deformed easily.

Therefore, some bicycle practitioners further develop bicycle wheel's structure, such as "manufacturing method and structure of bicycle rim" disclosed in TW 200950990A. The manufacturing method includes:

A. forming, wherein a metal material is formed into a tubular body;

B. jointing, wherein two terminals of the tubular body are jointed;

C. rounding, wherein the jointed tubular body is molded to a rim;

D. drilling, wherein the rim is drilled to form several spoke coupling holes;

E. drilling weight decreasing holes, wherein the rim is drilled to form several weight decreasing holes;

F. surface treatment, wherein the edges of the rim are trimmed and the surface of the rim is polished;

G. covering carbon fibers, wherein the surface of the weight decreasing holes and the rim is covered with carbon fibers to seal the weight decreasing hole, and a rim structure is formed.

However, in TW 200950990A, only the weight decreasing holes of the rim are filled with carbon fibers and only the edges of the carbon fibers are joined with the edges of the weight decreasing holes. Therefore, the effect of increasing the structure strength is not obvious.

SUMMARY

One purpose of this invention is providing a manufacturing method and structure of a carbon fiber rim. Under the premise of lightweight rim, the excellent structure strength as well as time saving, labor saving, cost decreased in the manufacturing method and structure of the carbon fiber rim may be reached.

The purpose and effect of this invention is reached by the following means of specific techniques.

A method of manufacturing carbon fiber rim is provided. The steps comprise:

A. forming a metal strip having a needed shape by heating a metal substrate to a moldable temperature and then extruding, wherein the metal strip comprises two side walls, a connecting wall connecting opposite terminal surfaces of the side walls, an inner rim wall connecting the radial inner edges of the side walls to form a space surrounded by the side walls, the connecting wall, and the inner rim wall;

B. connecting two terminals of the strip to form a circle as a rim frame's embryo;

C. forming through holes and spoke coupling holes by milling the rim frame's embryo to form a rim frame, wherein the spoke coupling holes was formed on the inner rim wall and at positions not corresponding to any through hole but disposed between the through holes, and spoke coupling elements are disposed in the spoke coupling holes;

D. performing a surface roughening treatment on the rim frame having the through holes and the spoke coupling holes thereon to increase roughness of the rim frame's surface;

E. covering a carbon fiber cloth by trimming the carbon fiber cloth to a suitable shape and then covering the rim frame and the through holes by the trimmed carbon fiber cloth;

F. heatsetting the rim frame covered by the trimmed carbon fiber cloth in a model to form a carbon fiber layer on the rim frame and thus form a semi-finished carbon fiber rim; and G. treating a surface of the semi-finished carbon fiber rim to form a finishing carbon fiber rim of a bicycle.

In the method of manufacturing carbon fiber rim described above, a material of the metal substrate is one of aluminum alloy and magnesium alloy.

In the method of manufacturing carbon fiber rim described above, a method of treating the surface of the semi-finished carbon fiber rim comprises steps of polishing the surface and spraying a protective layer.

In the method of manufacturing carbon fiber rim described above, the rim frame is covered by 1-2 layers of the carbon fiber cloth.

In the method of manufacturing carbon fiber rim described above, the inner rim wall between the spoke coupling holes is arcuately recessed toward the connecting wall or arcuately protruded away from the connecting wall.

In the method of manufacturing carbon fiber rim described above, through grooves are further formed by milling the rim frame and positioned on the side walls above the connecting wall, and each of the through grooves is at a position corresponding to each of the through holes.

In the method of manufacturing carbon fiber rim described above, the through holes is formed by milling along the two side walls of the rim frame's embryo at a predetermined interval, or formed by milling along the two side walls and the inner rim wall of the rim frame's embryo at a predetermined interval to make the range of each through hole covers the two side walls and the inner rim wall.

A structure of a carbon fiber rim, which is made by the method above, is provided. The carbon fiber rim comprises: a rim frame and a carbon fiber layer covering thereon. The rim frame comprises two side walls, a connecting wall connecting opposite terminal surfaces of the side walls, an inner rim wall connecting the radial inner edges of the side walls to form a space surrounded by the side walls, the connecting wall, and the inner rim wall, a plurality of through holes, and a plurality of spoke coupling holes. The spoke coupling holes at positions not corresponding to any through hole and disposed between the through holes are formed on the inner rim wall, and spoke coupling elements are disposed in the spoke coupling holes. The carbon fiber layer covers a surface of the rim frame and the through holes, as well as is penetrated by the spoke coupling elements to fix a covering position of the carbon fiber layer.

The advantages of this invention include:

1. The milled through holes are disposed along the two side walls or both the two side walls and the connecting walls at a predetermined interval. Therefore, the spoke coupling elements can be installed on the spoke coupling holes through those milled though holes more easily and conveniently.

2. The spoke coupling elements are well installed before covering the carbon fiber cloth on the surface of the rim frame. Therefore, at the time of covering the set carbon fiber layer, holes can be drilled on the carbon fiber cloth to correspondingly install the spoke coupling element protruding from the rim frame and conveniently locate the covered carbon fiber cloth.

3. The weight of the metal rim frame is decreased to the lightest weight by milling the through holes. In addition, the structure strength of the finishing rim can be increased by covering carbon fiber layers on the surface of the rim frame. Therefore, the carbon fiber rim has advantages of both light weight and good structure strength.

4. The carbon fiber rim of this invention is made by using the metal material as the rim frame and then laminating carbon fiber cloth on the surface of the rim frame. Therefore, the number of laminating carbon fiber cloth layers can be greatly decreased to decrease the use amount of carbon fiber cloth to reach the effect of cost down.

5. Since the carbon fiber rim of this invention can greatly decrease the number of laminating carbon fiber cloth layers, the working hours and processes also can be reduced to increase the rate of manufacturing process and capacity.

6. Since the carbon fiber rim of this invention can greatly decrease the number of laminating carbon fiber cloth layers, the occurring probability of bubbles is decreased to increase the yield.

DETAILED DESCRIPTION

Figure 1:
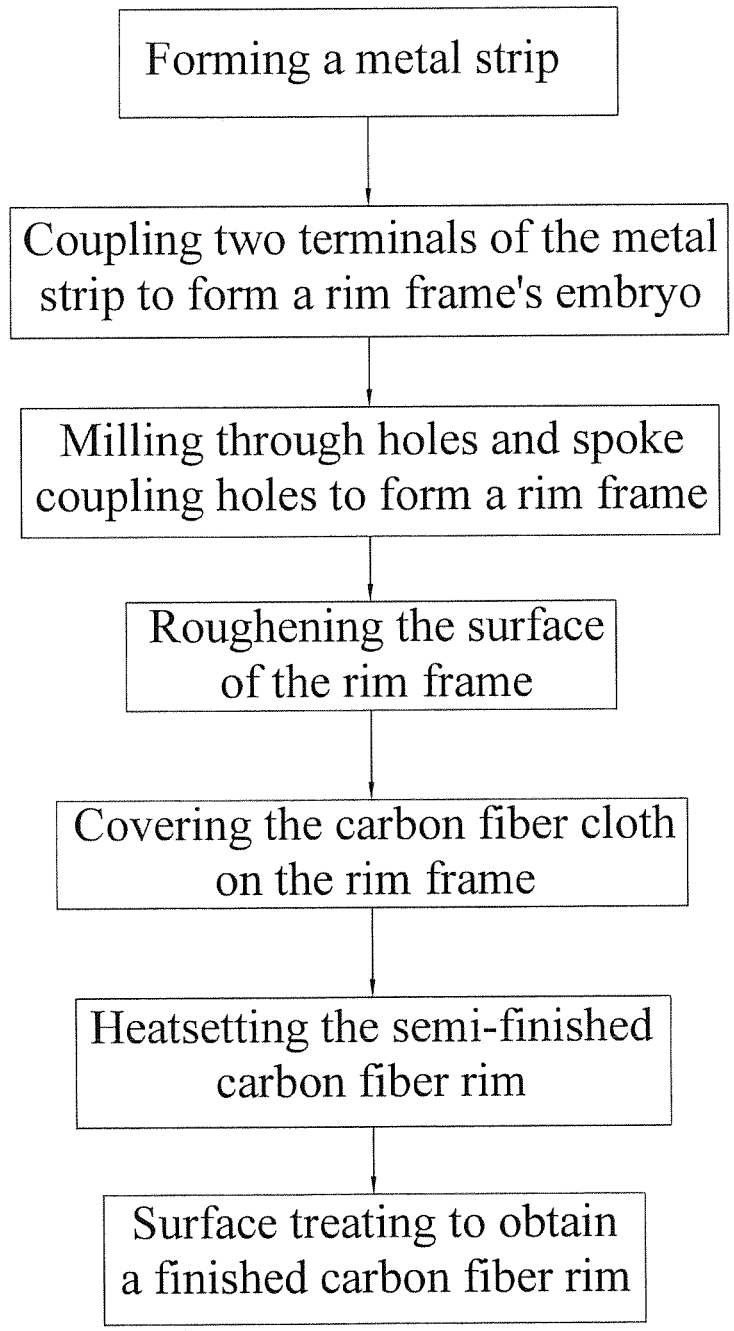
FIG. 1 is a process flow diagram of manufacturing a carbon fiber rim of this invention.
Figure 2:
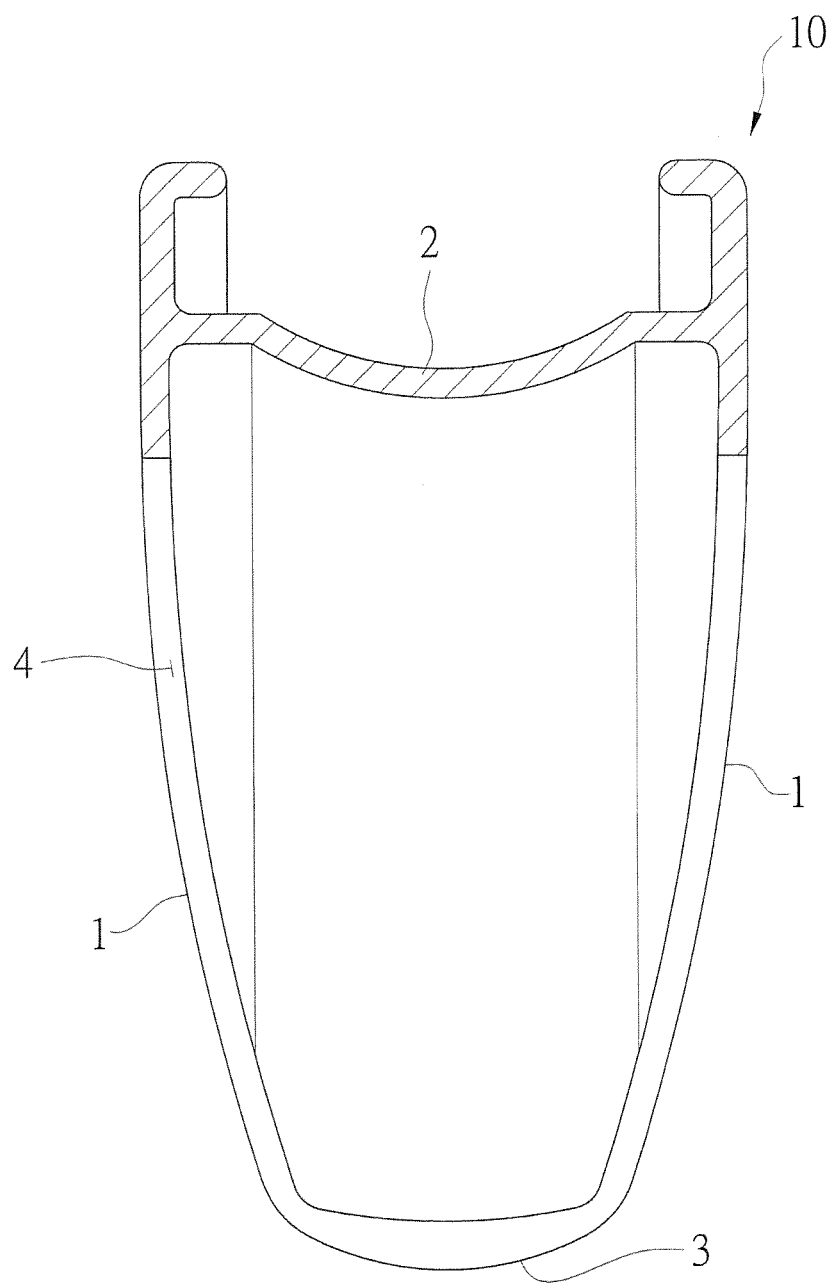
FIG. 2 is a radial cross-sectional diagram of a rim frame's embryo of this invention.

Referring to FIG. 1, which is a process flow diagram of manufacturing a carbon fiber rim according to a preferred embodiment of this invention. The manufacturing method of carbon fiber rim of this invention comprises the following steps:

A. A metal strip is formed by heating a metal substrate to a moldable temperature and then extrusion molding the plastic metal to form the metal strip having a needed shape (please also refer to FIG. 2). The metal strip comprises two side walls (1), a connecting wall (2) connecting opposite terminal surfaces of the side walls (1), an inner rim wall (3) connecting the radial inner edges of the side walls (1) to form a space surrounded by the side walls (1), the connecting wall (2), and the inner rim wall (3).

B. Two terminals of the strip are connected to form a circle as a rim frame's embryo.

Figure 3:
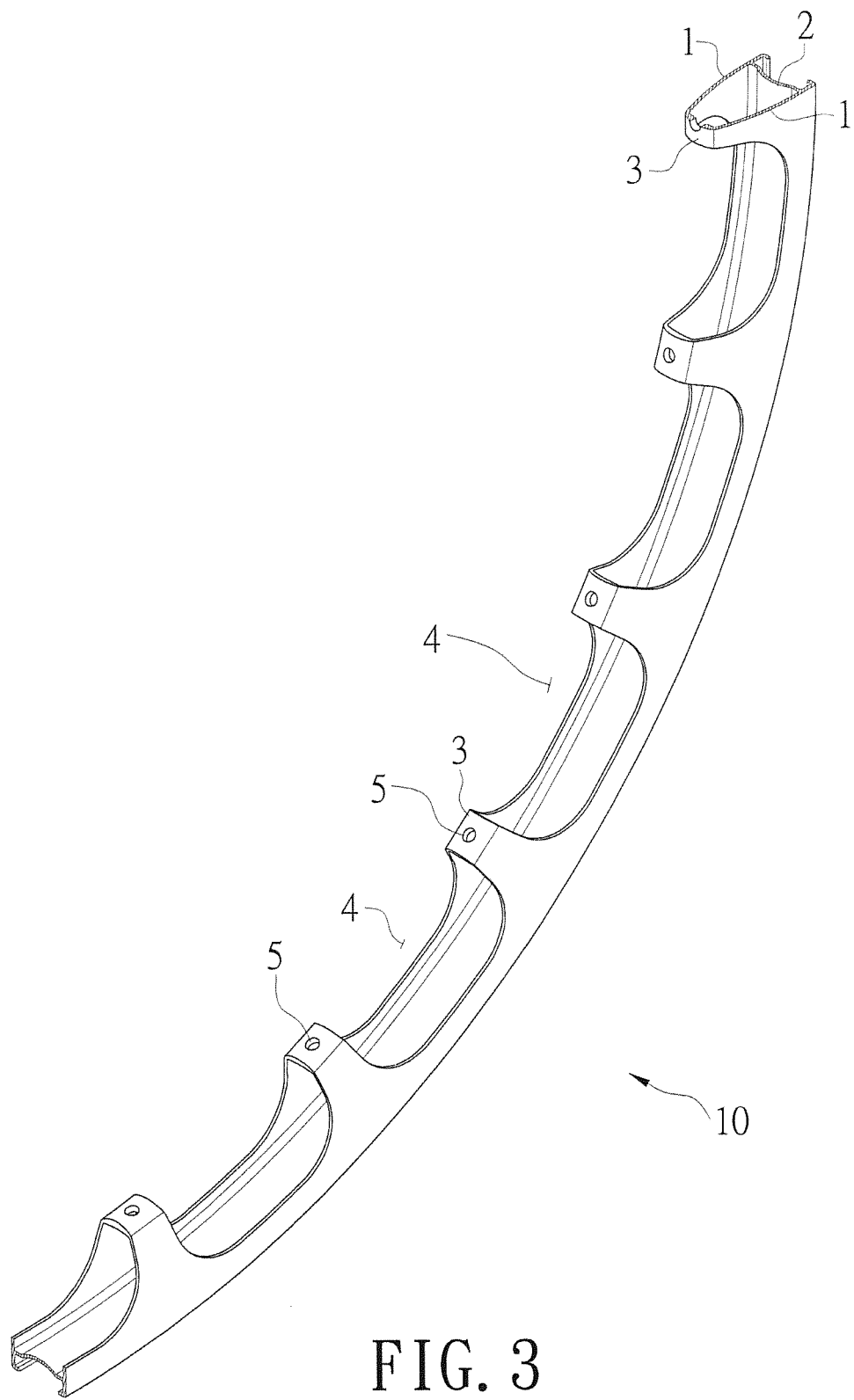
FIG. 3 is a perspective diagram of one section of a rim frame of this invention.
Figure 4:
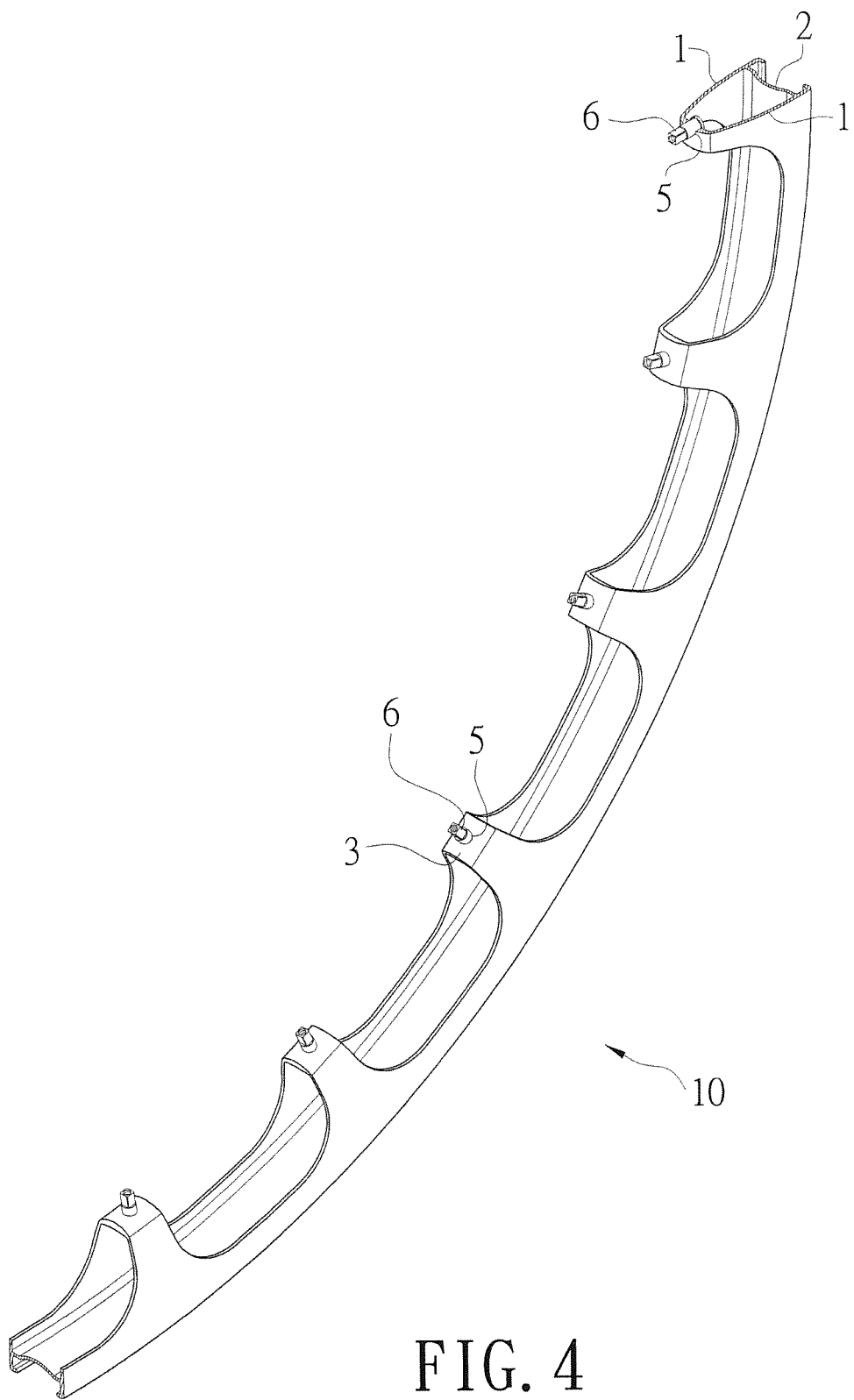
FIG. 4 is a perspective diagram of one section of a rim frame of this invention, and spoke coupling elements are disposed in spoke coupling holes.
Figure 5:
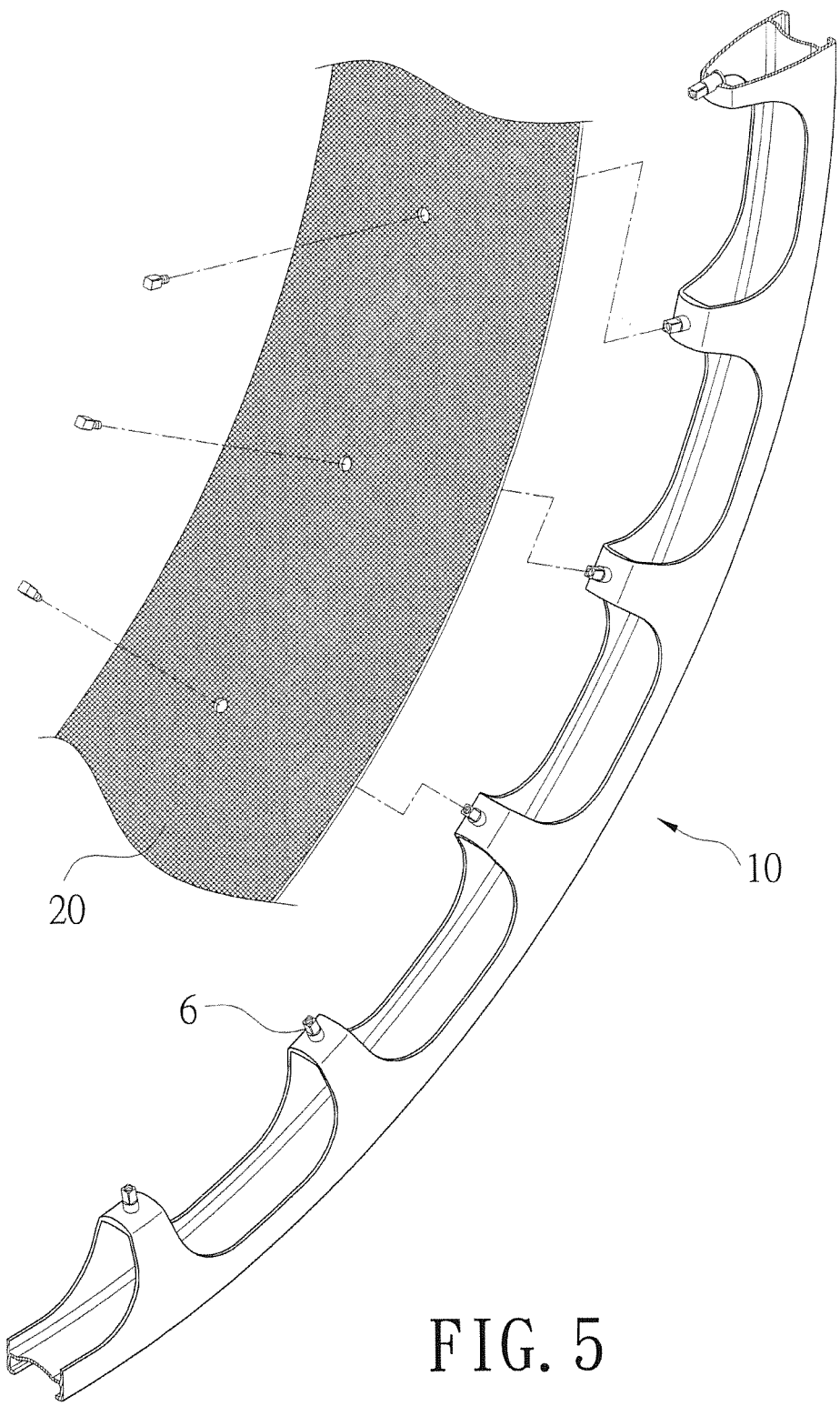
FIG. 5 is an exploded perspective diagram of one section of a rim frame and carbon fiber cloth of this invention.

C. Through holes (4) and spoke coupling holes (5) (in FIG. 3) are formed by milling the rim frame's embryo to form a rim frame (10). The through holes (4) (in FIGS. 3-5) is formed by milling along the two side walls (1) and the inner rim wall (3) of the rim frame's embryo to make each of the through holes (4) cover the two side walls (1) and the inner rim wall (3). The spoke coupling holes (5) was formed on the inner rim wall (3), and the spoke coupling holes (5) and the through holes (4) are alternatively disposed. Thus, two sides of each of the sole coupling holes (5) are adjacent to the through holes (4). Spoke coupling elements (6) are disposed in each of the spoke coupling holes (5) (in FIG. 4).

D. A surface roughening treatment is performed. The surface of the rim frame (10) having the through holes (4) and the spoke coupling holes (5) thereon is roughened to increase the roughness of the rim frame (10).

E. A carbon fiber cloth (20) is covered (in FIG. 5). The carbon fiber cloth (20) is trimmed to a suitable shape and then covered on the surface of the rim frame (10) and the through holes (4) at the same time. At the same time, the carbon fiber cloth is also penetrated by the spoke coupling elements (6) to fix the covering position of the carbon fiber cloth (20).

F. The rim frame (10) covered by the trimmed carbon fiber cloth (20) in a model is heatset to form a carbon fiber layer (30) on the rim frame (10) and thus a semi-finished carbon fiber rim is formed.

Figure 6:
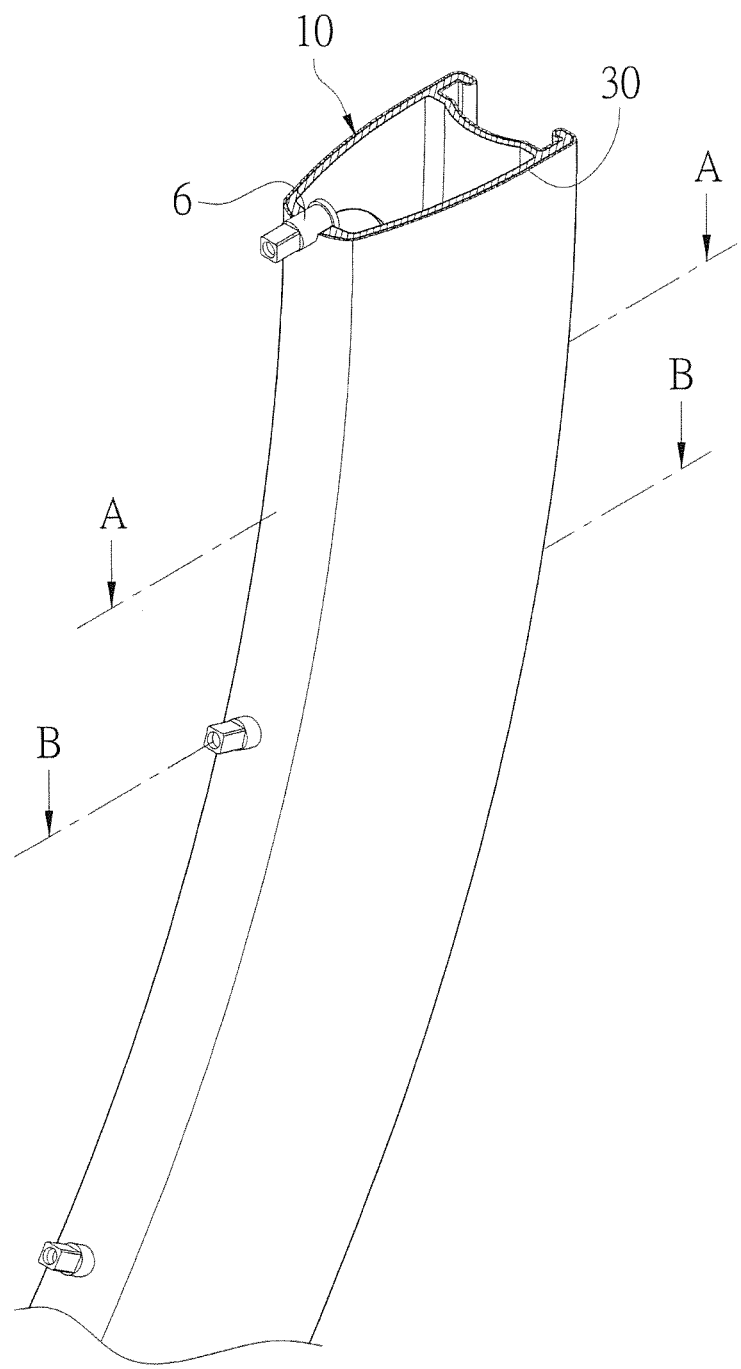
FIG. 6 is a perspective diagram of one section of a finishing carbon fiber rim of this invention.
Figure 7:
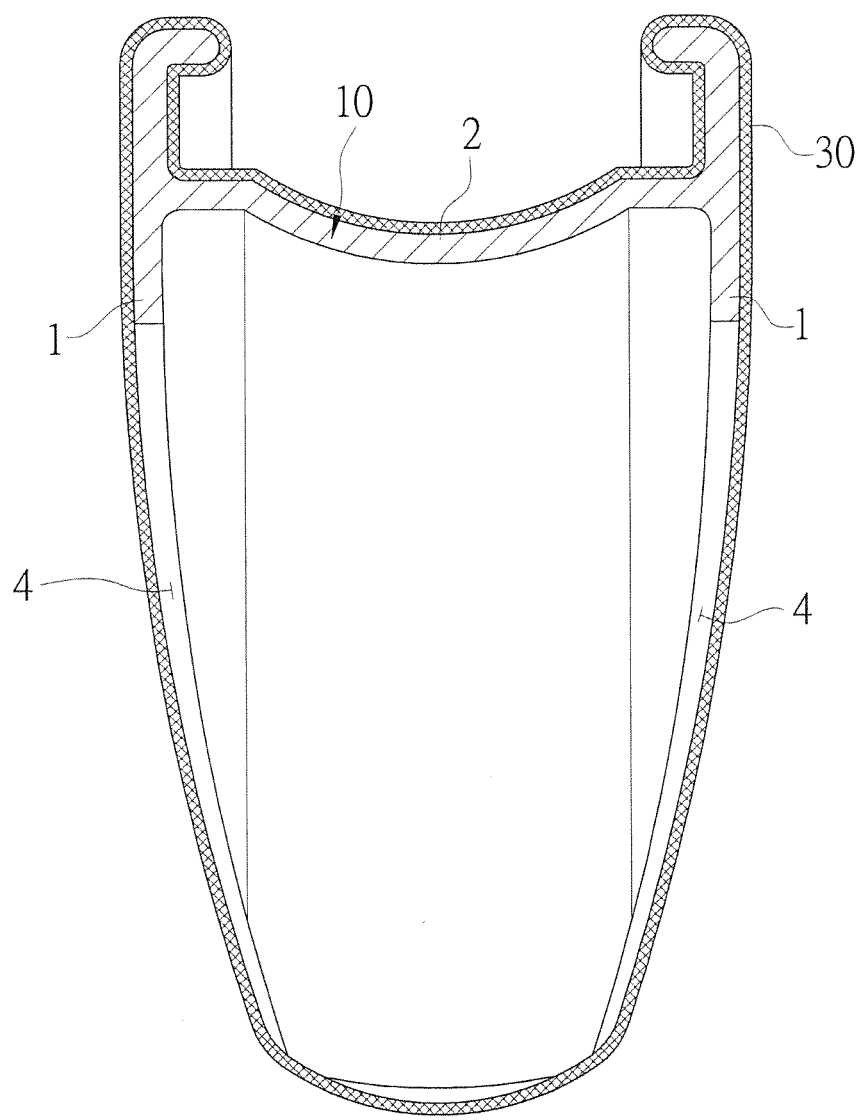
FIG. 7 is a cross-sectional diagram along A-A line in FIG. 6.
Figure 8:
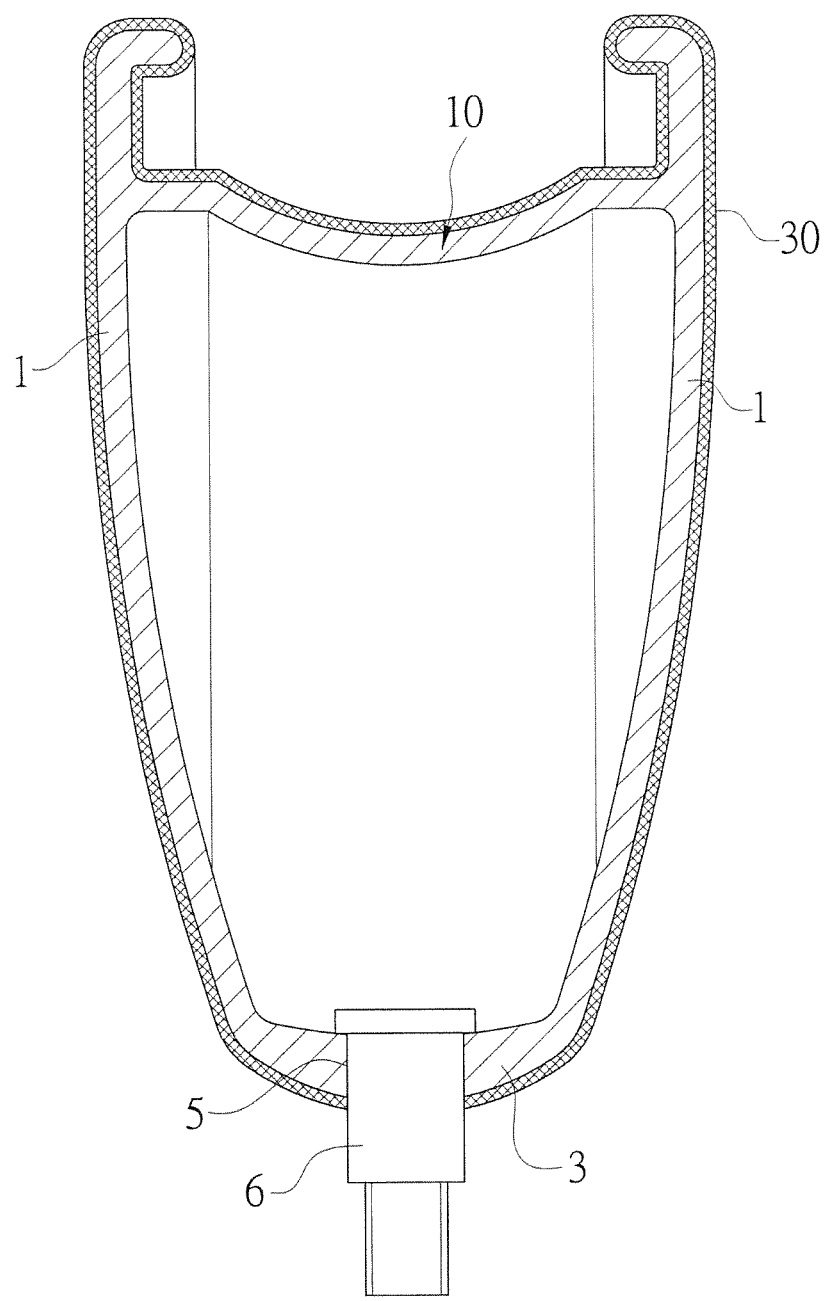
FIG. 8 is a cross-sectional diagram along B-B line in FIG. 6.

G. The surface of the semi-finished carbon fiber rim covered by the carbon fiber cloth (20) is treated by, for example, spraying a protective layer and surface polishing etc., to obtain a finishing carbon fiber rim (in FIGS. 6-8).

Figure 9:
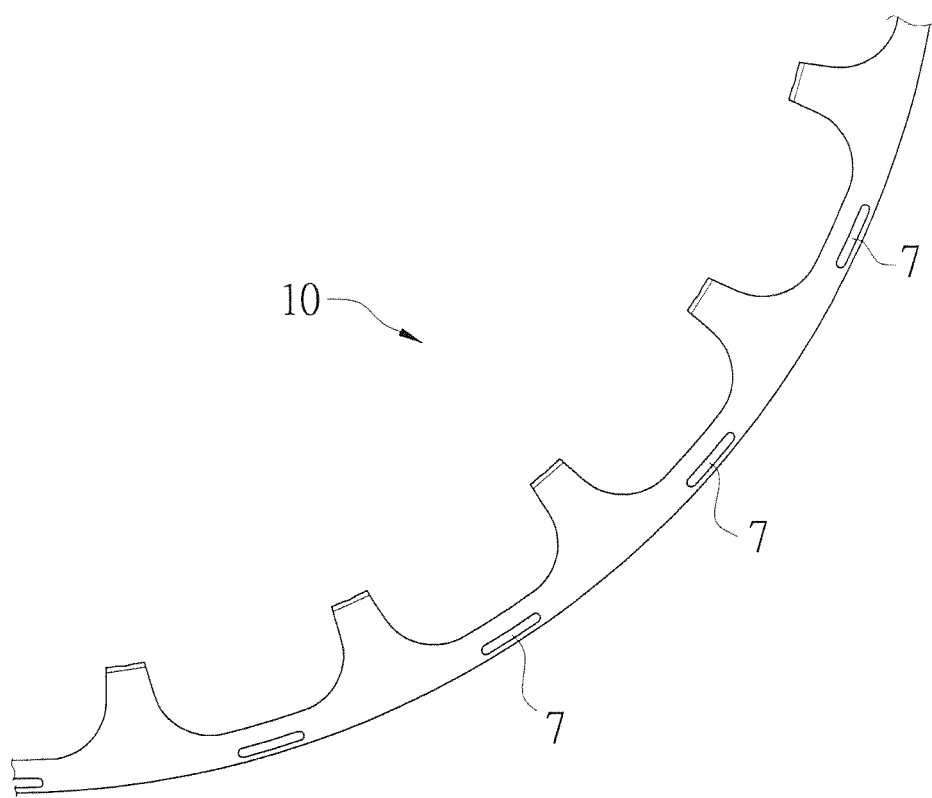
FIG. 9 is a perspective diagram of one section of a rim frame according to a second embodiment of this invention.

In a second preferred embodiment of this invention, plural through grooves (7) are formed by milling in the step C. These through grooves (7) are located at positions on the side walls (1) above the connecting wall (2) and corresponding to each of the through holes (4) (please refer to FIG. 9).

Figure 10:
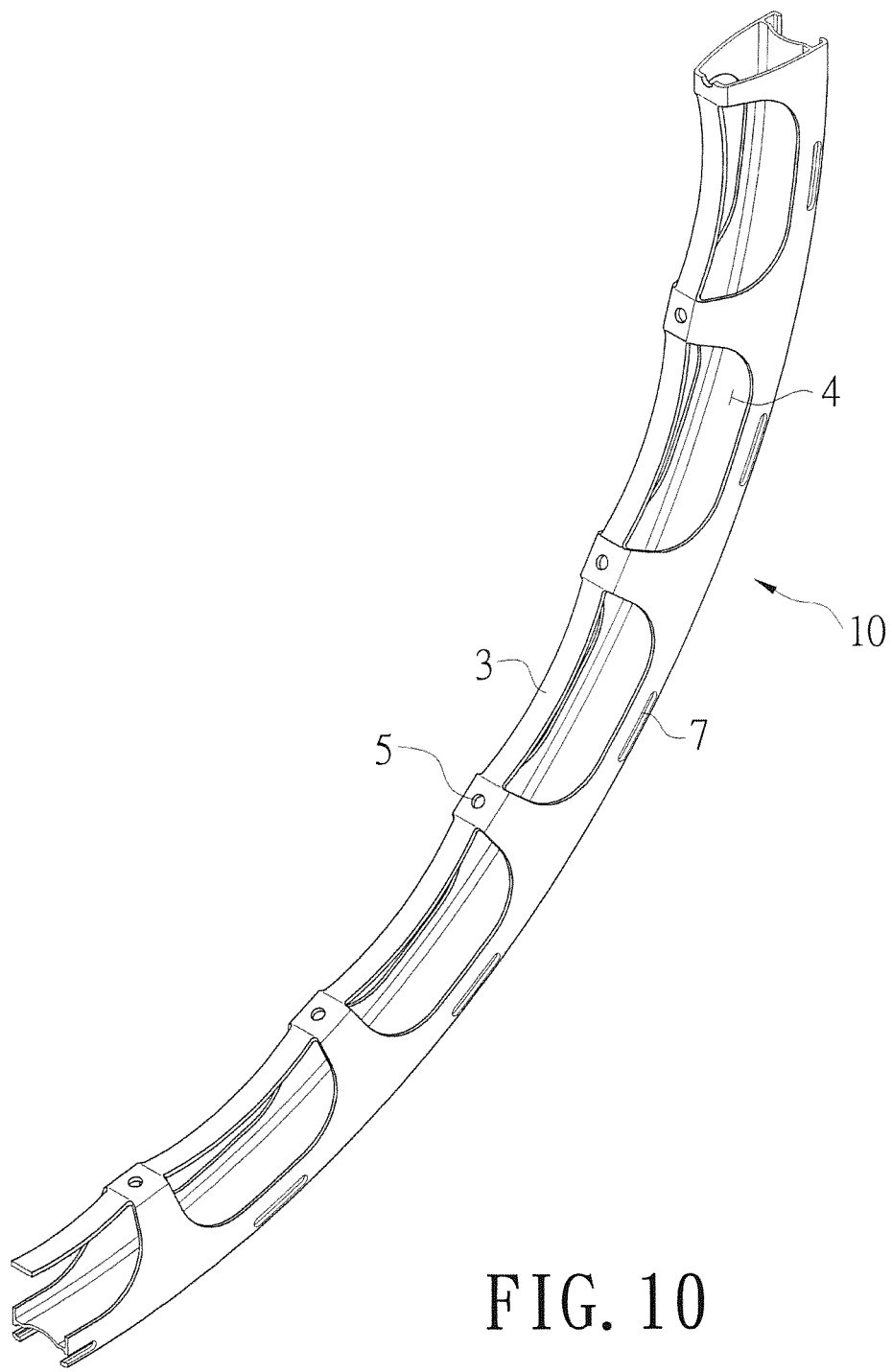
FIG. 10 is a perspective diagram of one section of a rim frame according to a third embodiment of this invention.
Figure 11:
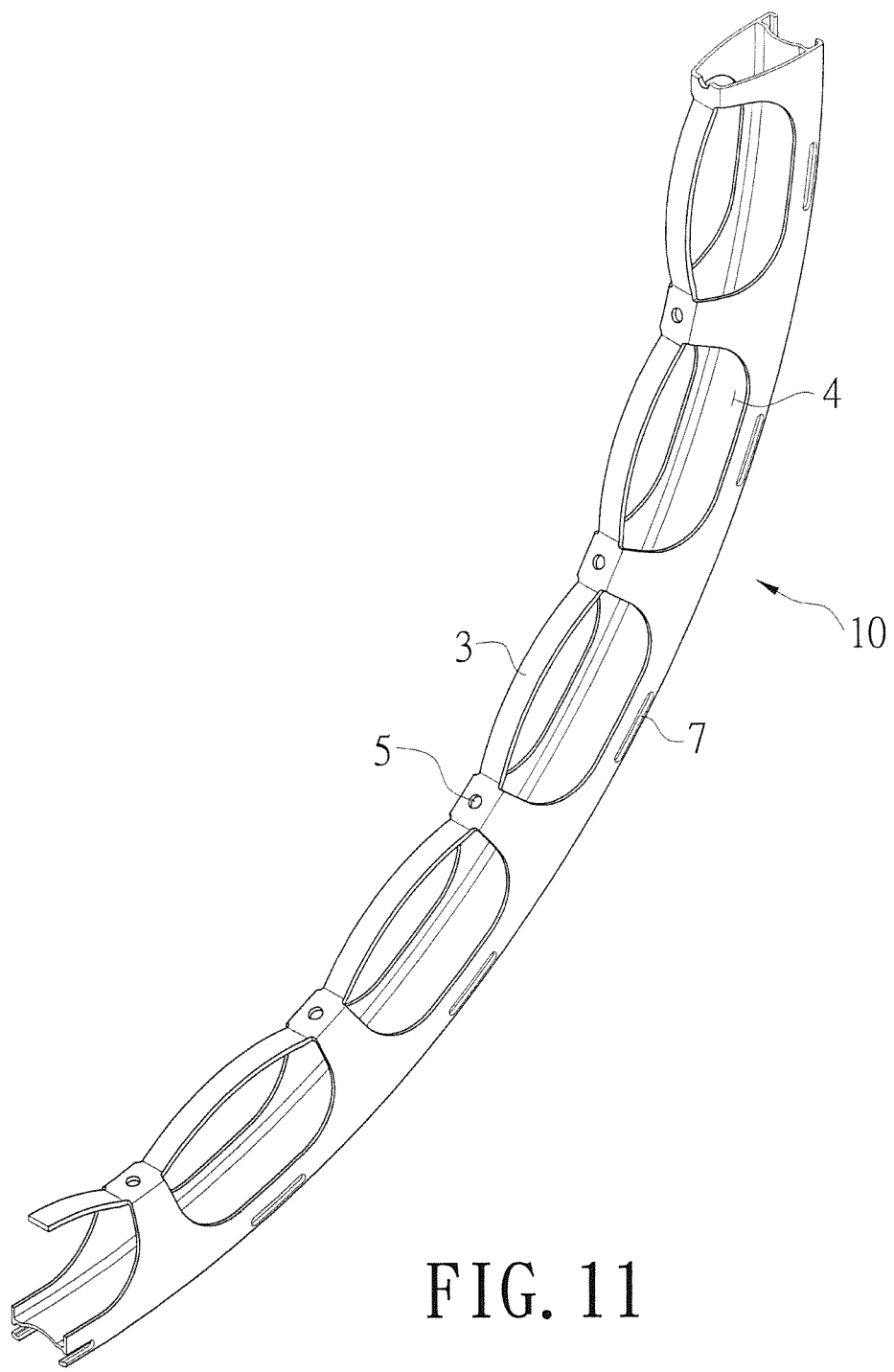
FIG. 11 is a perspective diagram of one section of a rim frame according to a fourth embodiment of this invention.

In a third preferred embodiment and a fourth preferred embodiment of this invention, the positions of the milled through holes (4) are changed in the step C. That is, the through holes (4) are formed by milling along the two side walls (1) of the rim frame's embryo at a predetermined interval (please referring to FIG. 10 and FIG. 11). Those spoke coupling holes (5) are milled and formed on the inner rim wall (3). Each of the spoke coupling holes (5) is not disposed at positions corresponding to any one of the through holes (4) but at positions between the adjacent two through holes (4). The inner rim wall (3) between the spoke coupling holes (5) is arcuately recessed toward the connecting wall (2) (please referring to FIG. 10) or arcuately protruded away from the connecting wall (2) (please referring to FIG. 11).

In the first, second, third and fourth preferred embodiments of this invention, the material of the metal substrate is one of aluminum alloy and magnesium alloy. The magnesium alloy is a highly active metal and can be easily oxidized. Therefore, the magnesium alloy cannot be exposed in the air for a long time. The carbon fiber layer formed by covering carbon fiber clothes on the magnesium alloy can prevent the magnesium alloy from oxidizing and increase the durability thereof.

In this invention, the structure of the carbon fiber rim made by the method described above comprises a rim frame (10) and a carbon fiber layer (30) covered thereon. The rim frame (10) comprises two side walls (1), a connecting wall (2) connecting opposite terminal surfaces of the side walls (1), an inner rim wall (3) connecting the radial inner edges of the side walls (1) to form a space surrounded by the side walls (1), the connecting wall (2), and the inner rim wall (3), plural through holes (4), and plural spoke coupling holes (5). These through holes (4) are formed by milling along the two side walls (1) of the rim frame (10) at a predetermined interval. The spoke coupling holes (5) are formed on the inner rim wall (3) and at positions not corresponding to any through hole (4) but between the adjacent two through holes (4). The carbon fiber layer (30) covers a surface of the rim frame (10) and the through holes (4). The inner rim wall (3) between the spoke coupling holes (5) is arcuately recessed toward the connecting wall (2). Certainly, the inner rim wall (3) between the spoke coupling holes (5) also can be designed to arcuately protruded away from the connecting wall (2).

The difference between another structure of the carbon fiber rim made by the method of manufacturing the carbon fiber rim of this invention and the structure of the carbon fiber rim above is that the through holes (4) are formed by milling along the two side walls (1) and the inner rim walls (3) at a predetermined interval. Therefore, the range of each through hole (4) covers the two side walls (1) and the inner rim walls (3). The spoke coupling holes (5) is formed by milling on the inner rim wall (3). The spoke coupling holes (5) and the through holes (4) are alternatively disposed to let the two sides of the spoke coupling holes (5) are both adjacent to the through holes (4).

In addition, plural through grooves (7) are formed on the rim frame (10) by milling. The positions of the through grooves (7) are at the side walls (1) above the connecting wall (2) and corresponding to the positions of each through holes (4) (please referring to FIG. 9).

Moreover, the rim frame (10) is made of aluminum alloy or magnesium alloy.

<Embodiment>

An aluminum alloy was heated to a moldable temperature and then extruded to form a metal strip having a width of 25 mm and a height of 29 mm. The metal strip comprises two side walls (1), a connecting wall (2) connecting opposite terminal surfaces of the side walls (1), an inner rim wall (3) connecting the radial inner edges of the side walls (1) to form a space surrounded by the side walls (1), the connecting wall (2), and the inner rim wall (3). The meaning of the "width' are the distance between the two side walls (1), and the meaning of the "height" is the distance from the bottom to the top of the side walls (1). Next, the two terminals of the strip are connected to form a circle as a rim frame's embryo. The rim frame's embryo is milled to form through holes (4) including the two side walls (1) and the inner rim wall (3) as well as the spoke coupling holes (5) on the inner rim walls (3). The spoke coupling holes (5) and the through holes (4) are disposed alternatively to form the rim frame (10). Spoke coupling elements (6) are disposed in each of the spoke coupling holes (5). Subsequently, the surface of the rim frame (10) was roughened, and a carbon fiber cloth (20) trimmed to a predetermined shape is covered on the surface of the rim frame (10) as well as the through holes (4). The layer number of the carbon fiber cloth (20) was 1. Finally, the rim frame (10) was placed in a mold and heatset to form a semi-finished carbon fiber rim. After the surface treatment, a finished carbon fiber rim was obtained.

Some comparisons are made for both the carbon fiber rim above and a traditional carbon fiber rim having 7 layers of carbon fiber cloth. The tested items include manufacturing time, weight, EN road racing test, and EN durability test. The results are listed in Table 1.

TABLE 1

|  | This invention | traditional |
| --- | --- | --- |
| manufacturing time | 20 minutes | 70 minutes |
| weight | 360 g | 380 g |
| EN road racing test | about 8100 km | about 6000 km |

From Table 1, comparing with the traditional carbon fiber rim, it can be known that the carbon fiber rim having a rim frame inside made by the method of this invention has a much shorter manufacturing time, and the weight thereof is less than the traditional carbon rim. In the EN road racing test, the carbon fiber rim was 2100 km more than the traditional carbon fiber rim. In the durability test, the carbon fiber rim of this invention is overall increased by 30% compared to the traditional carbon fiber rim.

What is claimed is:

1. A manufacturing method of carbon fiber rims, comprising:
    forming a metal strip having a needed shape by heating a metal substrate to a moldable temperature;
    extruding the heated metal substrate to form a metal strip having two side walls, a connecting wall connecting opposite terminal surfaces of the side walls, and an inner rim wall connecting respective radial inner edges of the two side walls to form a space surrounded by the side walls, the connecting wall and the inner rim wall;
    connecting two terminal ends of the strip to form a circle and thereby define a rim frame's embryo;
    forming a plurality of through holes and a plurality of spoke coupling holes by milling the rim frame's embryo to form a rim frame, each spoke coupling hole being formed in the inner rim wall and at a portion of the inner rim wall disposed between an adjacent two through holes, and each spoke coupling element being disposed in each spoke coupling hole;
    performing a surface roughening treatment on the rim frame having the plurality of through holes and the plurality of spoke coupling holes thereon to increase roughness of a surface of the rim frame;
    trimming a carbon fiber cloth to a suitable shape and then covering the rim frame and the plurality of through holes with the trimmed carbon fiber cloth;
    heatsetting the rim frame covered by the trimmed carbon fiber cloth in a mold to form a carbon fiber layer on the rim frame and thus form a semi-finished carbon fiber rim; and
    treating a surface of the semi-finished carbon fiber rim to form a finished carbon fiber rim of a bicycle.

2. The manufacturing method of claim 1, wherein the plurality of through holes are formed by milling along the two side walls of the rim frame's embryo at a predetermined interval, or formed by milling along the two side walls and the inner rim wall of the rim frame's embryo at a predetermined interval.

3. The manufacturing method of claim 2, further comprising forming a plurality of through grooves in the side walls by milling the side walls of the rim frame at positions disposed above the connecting wall, and each of the through grooves in each side wall being disposed in correspondence with a respective one of the plurality of through holes.

4. The manufacturing method of claim 1, wherein a material of the metal substrate is an aluminum alloy or a magnesium alloy.

5. The manufacturing method of claim 1, wherein the step of treating a surface of the semi-finished carbon fiber rim includes the steps of polishing the surface of the semi-finished carbon fiber rim and spraying a protective layer thereon.

6. The manufacturing method of claim 1, wherein the step of covering the rim frame includes the step of covering the rim frame with a second layer of the trimmed carbon fiber cloth.

7. The manufacturing method of claim 6, further comprising forming a plurality of through grooves in the side walls by milling the side walls of the rim frame at positions disposed above the connecting wall, and each of the through grooves in each side wall being disposed in correspondence with a respective one of the plurality of through holes.

8. The manufacturing method of claim 1, wherein portions of the inner rim wall between the spoke coupling holes is arcuately recessed toward the connecting wall or arcuately protruded away from the connecting wall.

9. The manufacturing method of claim 8, further comprising forming a plurality of through grooves in the side walls by milling the side walls of the rim frame at positions disposed above the connecting wall, and each of the through grooves in each side wall being disposed in correspondence with a respective one of the plurality of through holes.

10. The manufacturing method of claim 1, further comprising forming a plurality of through grooves in the side walls by milling the side walls of the rim frame at positions disposed above the connecting wall, and each of the through grooves in each side wall being disposed in correspondence with a respective one of the plurality of through holes.

* * * * *